United States Patent
Liu et al.

(10) Patent No.: US 12,308,015 B2
(45) Date of Patent: May 20, 2025

(54) TRAINING METHOD AND APPARATUS FOR SPEECH TRANSLATION MODEL, SPEECH TRANSLATION METHOD AND APPARATUS, AND DEVICE

(71) Applicant: Beijing Youzhuju Network Technology Co., Ltd., Beijing (CN)

(72) Inventors: Zhicheng Liu, Beijing (CN); Jian Tong, Beijing (CN); Chengqi Zhao, Beijing (CN); Tao Wang, Beijing (CN); Mingxuan Wang, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/752,273

(22) Filed: Jun. 24, 2024

(65) Prior Publication Data

US 2024/0347044 A1    Oct. 17, 2024

Related U.S. Application Data

(63) Continuation of application No. PCT/CN2023/082944, filed on Mar. 22, 2023.

(30) Foreign Application Priority Data

Mar. 29, 2022 (CN) .......................... 202210319911.5

(51) Int. Cl.
*G10L 15/06* (2013.01)
*G06F 40/58* (2020.01)
*G10L 15/18* (2013.01)

(52) U.S. Cl.
CPC ............ *G10L 15/063* (2013.01); *G06F 40/58* (2020.01); *G10L 15/1815* (2013.01)

(58) Field of Classification Search
CPC ... G10L 15/063; G10L 15/1815; G10L 15/00; G06F 40/58; G06F 40/00
See application file for complete search history.

(56) References Cited

U.S. PATENT DOCUMENTS 11,392,777 B2 *   7/2022   Greenberg .............. G06F 40/58
2007/0239634 A1  10/2007  Tian et al.
(Continued)

FOREIGN PATENT DOCUMENTS

CN      109635305 A       4/2019
CN      111597825 A       8/2020
(Continued)

OTHER PUBLICATIONS

ISA China National Intellectual Property Administration, International Search Report Issued in Application No. PCT/CN2023/082944, Jul. 6, 2023, 11 pages. (Submitted with partial English translation).

(Continued)

*Primary Examiner* — Michael Colucci
(74) *Attorney, Agent, or Firm* — Alleman Hall & Tuttle LLP

(57) ABSTRACT

A training method for a speech translation model, a speech translation method, an apparatus, and a device are provided. The training method includes: after entering a model training phase, controlling the speech translation model to execute a speech translation training task; controlling the speech translation model to simultaneously execute an auxiliary training task of the speech translation training task; and adjusting network parameters of the speech translation model according to the speech translation training task and the auxiliary training task, so as to obtain an updated speech translation model after training.

20 Claims, 5 Drawing Sheets

(56) References Cited

U.S. PATENT DOCUMENTS

| | | | | |
|---|---|---|---|---|
| 2007/0271088 | A1* | 11/2007 | Waibel | G06F 40/263 |
| | | | | 704/9 |
| 2011/0060587 | A1* | 3/2011 | Phillips | G10L 15/30 |
| | | | | 704/235 |
| 2015/0127319 | A1 | 5/2015 | Hwang et al. | |
| 2017/0139905 | A1* | 5/2017 | Na | G06N 3/084 |
| 2020/0043483 | A1* | 2/2020 | Prabhavalkar | G10L 15/16 |
| 2020/0117715 | A1* | 4/2020 | Lee | G06N 3/08 |
| 2020/0250384 | A1* | 8/2020 | Lee | G06F 16/9027 |
| 2020/0364412 | A1 | 11/2020 | Cheng et al. | |
| 2021/0027784 | A1* | 1/2021 | Li | G10L 15/26 |
| 2021/0103704 | A1* | 4/2021 | Li | G06F 40/42 |
| 2022/0343084 | A1* | 10/2022 | Nagata | G06F 40/44 |
| 2023/0367978 | A1* | 11/2023 | Gritta | G06F 40/58 |

FOREIGN PATENT DOCUMENTS

| | | |
|---|---|---|
| CN | 112183120 A | 1/2021 |
| CN | 112686058 A | 4/2021 |
| CN | 113378586 A | 9/2021 |
| CN | 114048758 A | 2/2022 |
| CN | 114139557 A | 3/2022 |
| CN | 114201975 A | 3/2022 |
| CN | 114822498 A | 7/2022 |
| KR | 1020210028041 A | 3/2021 |

OTHER PUBLICATIONS

China National Intellectual Property Administration, Notice of Allowance Issued in Application No. 202210319911.5, May 1, 2024, 8 pages.

European Patent Office, Communication pursuant to Rules 70(2) and 70a(2) EPC for European Application No. 23777935.0, mailed Mar. 28, 2025, 1 page.

European Patent Office, Extended European Search Report for European Application No. 23777935.0, mailed Mar. 11, 2025, 7 pages.

* cited by examiner

TRAINING METHOD AND APPARATUS FOR SPEECH TRANSLATION MODEL, SPEECH TRANSLATION METHOD AND APPARATUS, AND DEVICE

CROSS-REFERENCE TO RELATED APPLICATIONS

This application is a continuation of International Patent Application No. PCT/CN2023/082944, filed on Mar. 22, 2023, which claims the priority to and benefits of Chinese patent application No. 202210319911.5, filed on Mar. 29, 2022. All the aforementioned patent applications are hereby incorporated by reference in their entireties.

TECHNICAL FIELD

Embodiments of the present disclosure relate to the field of machine translation technology, for example, relate to a training method for a speech translation model, a speech translation method, an apparatus, and a device.

BACKGROUND

Speech translation is one of key technologies to break down language barriers by converting speech input of a certain language into text or speech of another language.

Speech translation has been widely applied, mainly to scenarios such as daily conversation and chat, conference simultaneous translation, real-time video subtitles, and so on. Related speech translation technologies enhance translation by introducing domain data such as automatic speech recognition (ASR) texts, rules or adversarial learning generation domain texts, etc. However, there are still many problems such as low translation quality and weak coherence of translation text, which lead to low accuracy of speech translation and inconvenience for user communication.

SUMMARY

Embodiments of the present disclosure provide a training method for a speech translation model, a speech translation method, an apparatus, a device, and a medium, to optimize robustness and generalization of speech translation and improve quality of speech translation.

In the first aspect, the embodiments of the present disclosure provide a training method for a speech translation model, and the method comprises:
  after entering a model training phase, controlling the speech translation model to execute a speech translation training task;
  controlling the speech translation model to simultaneously execute an auxiliary training task of the speech translation training task; and
  adjusting network parameters of the speech translation model according to the speech translation training task and the auxiliary training task, so as to obtain an updated speech translation model after training,
  wherein the speech translation training task is used for translating an original text participating in speech recognition, and the auxiliary training task is used for weakening a translation bias generated on the speech translation model caused by a bias between a text obtained with a speech recognition bias and text semantics.

In the second aspect, the embodiments of the present disclosure further provide a speech translation method, and the speech translation method comprises:
  acquiring a speech to be translated, and performing speech recognition on the speech to be translated to obtain a text sequence to be translated obtained through speech recognition; and
  inputting the text sequence to be translated obtained through speech recognition into a speech translation portion of a speech translation model that is trained, so as to obtain a translation of the text sequence to be translated,
  wherein the speech translation model is obtained by using the training method for the speech translation model provided by any one of the embodiments.

In the third aspect, the embodiments of the present disclosure further provide a training apparatus for a speech translation model, and the training apparatus comprises:
  a translation task control module, configured to, after entering a model training phase, control the speech translation model to execute a speech translation training task;
  a training auxiliary control module, configured to control the speech translation model to simultaneously execute an auxiliary training task of the speech translation training task; and
  a multi-task joint module, configured to adjust network parameters of the speech translation model according to the speech translation training task and the auxiliary training task, so as to obtain an updated speech translation model after training,
  wherein the speech translation training task is used for translating an original text participating in speech recognition, and the auxiliary training task is used for weakening a translation bias generated on the speech translation model caused by a bias between a text obtained with a speech recognition bias and text semantics.

In the fourth aspect, the embodiments of the present disclosure further provide a speech translation apparatus, and the speech translation apparatus comprises:
  an acquiring module, configured to acquire a speech to be translated and perform speech recognition on the speech to be translated to obtain a text sequence to be translated obtained through speech recognition; and
  a translating module, configured to input the text sequence to be translated obtained through speech recognition into a speech translation portion of a speech translation model that is trained, so as to obtain a translation of the text sequence to be translated,
  wherein the speech translation model is obtained by using the training method for the speech translation model provided by any one of the embodiments.

In the fifth aspect, the embodiments of the present disclosure further provide an electronic device, and the electronic device comprises:
  at least one processor; and
  a memory in communicative connection with the at least one processor,
  wherein the memory stores a computer program executable by the at least one processor, and the computer program is executed by the at least one processor to cause the at least one processor to be capable of executing the training method for the speech translation model provided by any one of the embodiments or the speech translation method provided by any one of the embodiments.

In the sixth aspect, the embodiments of the present disclosure further provide a computer readable medium, the computer readable medium stores computer instructions, and the computer instructions, when executed by a processor, are configured to implement the training method for the speech translation model provided by any one of the embodiments or the speech translation method provided by any one of the embodiments.

BRIEF DESCRIPTION OF DRAWINGS

The above and other features, advantages, and aspects of embodiments of the present disclosure will become more apparent by referring to the following detailed implementations taken in conjunction with the accompanying drawings. Throughout the drawings, the same or similar reference numerals indicate the same or similar elements. It should be understood that the drawings are schematic, and the components and elements are not necessarily drawn to scale.

DETAILED DESCRIPTION

Figure 1:
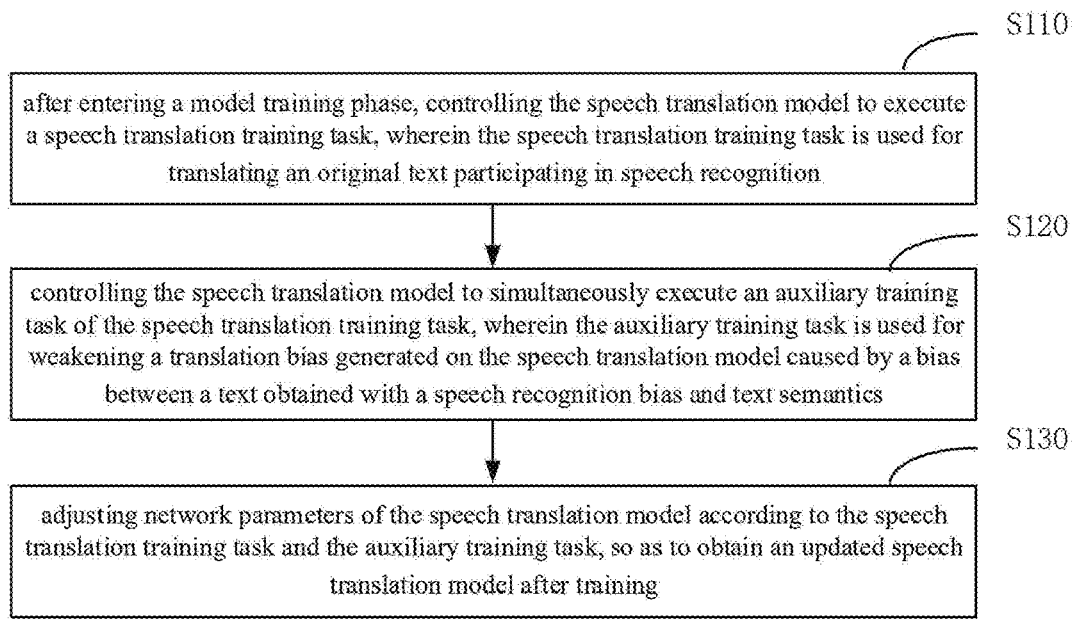
FIG. 1 is a flow chart of a training method for a speech translation model provided by an embodiment of the present disclosure.

Embodiments of the present disclosure will be described in more detail below with reference to the accompanying drawings. Although some embodiments of the present disclosure are illustrated in the drawings, it should be understood that the present disclosure can be embodied in various forms, and these embodiments are provided for a more thorough and complete understanding of the present disclosure. It should be understood that the drawings and embodiments of the present disclosure are only used for exemplary functions.

It should be understood that the steps described in the method implementations of the present disclosure can be performed in different orders and in parallel. Furthermore, the method implementations may include additional steps and/or omit to perform the illustrated steps.

As used herein, the terms "comprising" and "including" and their variants are open-ended comprising, that is, "comprising but not limited to". The term "based on" is "at least partially based on". The term "an embodiment" means "at least one embodiment"; the term "another embodiment" means "at least one other embodiment"; the term "some embodiments" means "at least some embodiments". Related definitions of other terms will be given in the following description.

It should be noted that the concepts of "first" and "second" mentioned in this disclosure are only used for distinguishing different apparatus, modules, or units, and are not used for limiting the order or interdependence of the functions performed by these apparatus, modules, or units.

It should be noted that the modifications of "a", "one" and "a plurality of" mentioned in this disclosure are schematic rather than limiting, and those skilled in the art should understand that unless the context clearly indicates otherwise, they should be understood as "one or more".

Names of messages or information exchanged among multiple apparatus in the implementations of the present disclosure are only used for illustrative purposes.

In the following embodiments, optional features and examples are provided simultaneously in each embodiment, and the various features recorded in the embodiments can be combined to form multiple optional solutions. Each numbered embodiment should not be considered as only one technical solution. In addition, without conflict, the embodiments and features in the embodiments in the present disclosure can be combined with each other.

FIG. 1 is a flow chart of a training method for a speech translation model provided by an embodiment of the present disclosure. The method according to this embodiment is applicable to the case of training a speech translation model to improve robustness of speech translation. The method may be executed by a speech translation model training apparatus. The apparatus may be implemented by software and/or hardware and usually integrated on any electronic device having a network communication function. The electronic device includes: a computer, a personal digital assistant, etc. As illustrated in FIG. 1, the training method for the speech translation model of this embodiment may include step S110 to step S130 below.

S110: after entering a model training phase, controlling the speech translation model to execute a speech translation training task.

The speech translation training task is used for translating an original text participating in speech recognition during the model training process.

Streaming speech translation may refer to a process of converting speech input of one language into text of another language and outputting the same in a streaming manner, and usually includes two phases: speech recognition and machine translation. Streaming speech translation has been applied to scenarios such as daily conversation and chat, conference simultaneous translation, real-time video subtitles, etc., and has been widely applied in large-scale academic conference such as artificial intelligence conference.

During the model training phase of the speech translation model, a corresponding original text sequence before speech recognition may be acquired, the original text sequence may be input as a training sample into the speech translation model for executing the speech translation training task to translate the original text participating in speech recognition into corresponding translation, and further the speech translation model may be trained and updated based on the obtained translation.

S120: controlling the speech translation model to simultaneously execute an auxiliary training task of the speech translation training task.

The auxiliary training task is used for weakening a translation bias generated on the speech translation model caused by a bias between a text obtained with a speech recognition bias and text semantics in the model training process.

Translation quality of streaming speech translation in application scenarios is poor and is affected by noise propagation in machine translation pre-process steps, for example, noise interference from a receiving device, incorrect speech recognition, and speaker errors, etc. In other words, differences between a text undergoing speech recognition before machine translation and the original text participating in speech recognition, and even semantic segmentation caused by factors such as intonation pauses, may affect subsequent machine translation of the text.

Illustration will be provided by taking following two translation instances as an example. In the following two translation scenarios, instance 1 has a redundant translation generated due to a punctuation error, while instance 2 has semantic segmentation in a translation due to an intonation pause, which greatly affect comprehensibility of the translations.

TABLE 1

Examples of streaming speech translation

| Type | Content |
| --- | --- |
| Speaker's original text | 1. For example, in some important information of common concern, concerned about by everyone (the original text is in chinese) |
| | 2. I want to talk to you about this [intonation pause] maybe I told you before (the original text is in chinese) |
| Speech recognition result | 1. For example, in some important information of common concern concerned about by everyone (the speech recognition result is in chinese) |
| | 2. I want to talk to you about this [intonation pause] maybe I told you before (the speech recognition result is in chinese) |
| Translations | 1. For example, in some important information of common concern that everyone is concerned about, |
| | 2. I want to talk to you about. maybe I told you before |

Based on the above-described problems of low translation quality in streaming speech translation, the speech translation model of the solutions of the present application has the auxiliary training task corresponding to the language translation training task added on the basis of the language translation training task based on robust machine translation.

Figure 2:
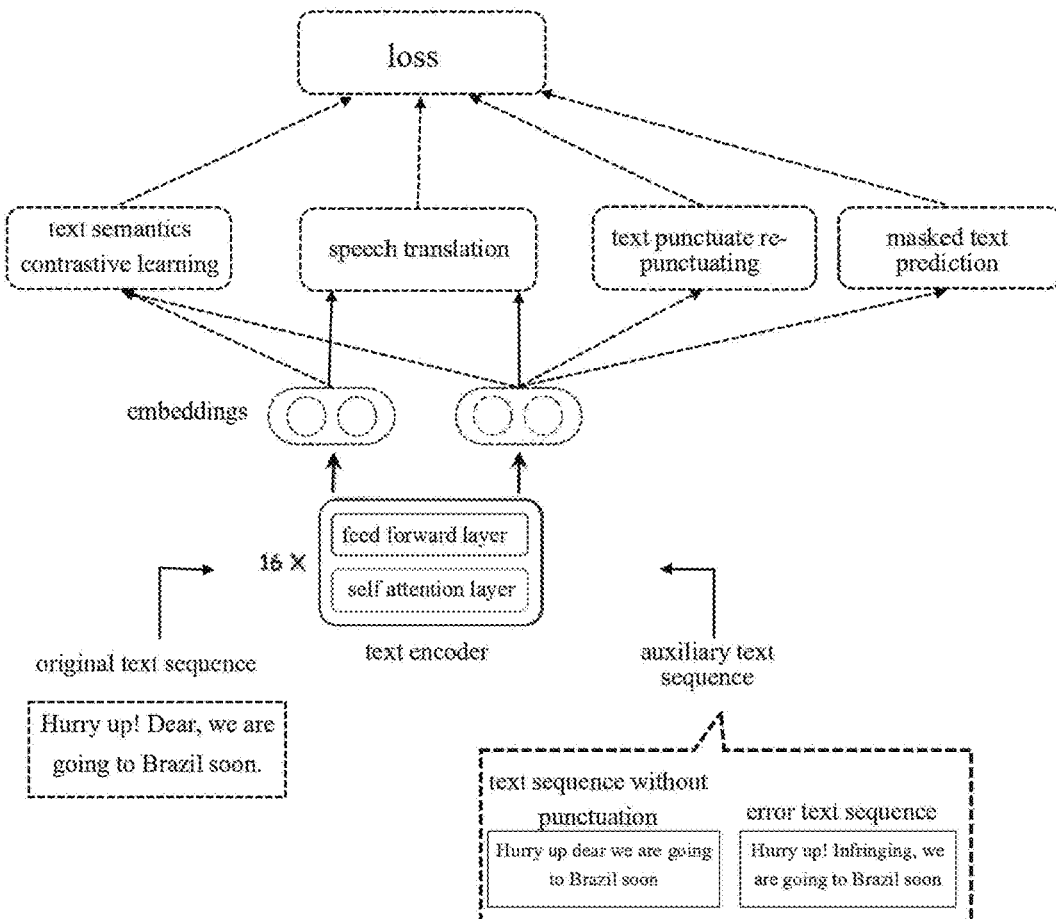
FIG. 2 is a schematic diagram of an overall architecture applicable to a multi-task auxiliary training speech translation model provided by an embodiment of the present disclosure.

Referring to FIG. 2, after entering the model training phase, the speech translation model not only executes the speech translation training task, but also needs to execute the auxiliary training task of the speech translation training task at the same time. Through the auxiliary training task, the translation bias caused by the bias between the text obtained with a speech recognition bias and text semantics may be gradually weakened during the process of training the speech translation model. This allows for adaptive correction of the executed speech translation training task and adjustment orienting to reduction of text sensitivity.

S130: adjusting network parameters of the speech translation model according to the speech translation training task and the auxiliary training task, so as to obtain an updated speech translation model after training.

In the method of the embodiments of the present disclosure, when training the speech translation model, a plurality of auxiliary training tasks are introduced to perform auxiliary training on the speech translation task, which weakens the translation bias caused by the bias between the text obtained with a speech recognition bias and text semantics, and optimize robustness and generalization of speech translation in the simultaneous translation scenario. Moreover, the speech translation based on robust machine translation in the technical solution of the present disclosure can effectively reduce sensitivity of the translation model to the output text, and reduce occurrences such as omissions, mistranslations, over-translations, etc. to the original text due to disturbance of errors.

Figure 3:
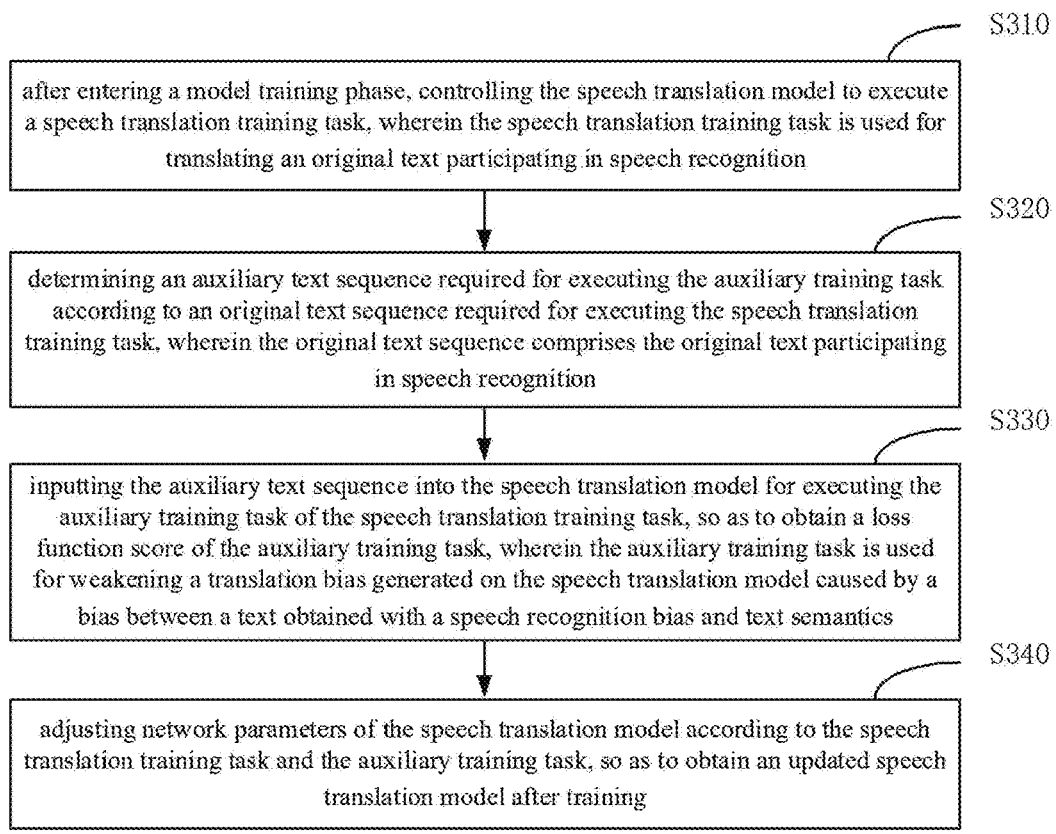
FIG. 3 is a flow chart of another training method for a speech translation model provided by an embodiment of the present disclosure.

FIG. 3 is a flow chart of another training method for a speech translation model provided by an embodiment of the present disclosure. The method of this embodiment is a further description of the auxiliary training task process of the speech translation training task according to the foregoing embodiments on the basis of the above-described embodiments. This embodiment may be combined with respective optional solutions in one or more of the above-described embodiments. As illustrated in FIG. 3, the training method for the speech translation model of this embodiment may include step S310 to step S340.

S310: after entering the model training phase, controlling the speech translation model to execute the speech translation training task according to the original text sequence required for executing the speech translation training task, to obtain a loss function score of the speech translation training task.

Referring to FIG. 2, the original text sequence required for executing the speech translation training task is obtained, and the original text sequence consists of the original text participating in speech recognition. The original text sequence is taken as a training sample required for executing the speech translation training task, and is input into the speech translation model for executing the speech translation training task to obtain the loss function score of the speech translation training task, for performing subsequent parameter optimization on the speech translation model based on the loss function score.

S320: determining an auxiliary text sequence required for executing the auxiliary training task according to the original text sequence required for executing the speech translation training task, wherein the original text sequence includes the original text participating in speech recognition.

Referring to FIG. 2, the speech translation process may be affected by the bias between the text obtained with a speech recognition bias and text semantics, so as to generate a translation bias on the speech translation model. In order to improve generalization and robustness of the model, sensitivity of the above-described factors to speech translation needs to be lowered as much as possible, so as to reduce occurrence such as omissions, mistranslations, and over-translations in the speech translation process caused by disturbance of errors on the original text. The original text sequence is no longer selected for use when executing each auxiliary training task. Instead, the original text sequence required for executing the speech translation training task is changed in an adaptive manner in combination with the task characteristic of each auxiliary training task, so as to obtain an auxiliary text sequence matched with each auxiliary training task for executing the auxiliary training task.

In an optional solution of this embodiment, determining the auxiliary text sequence required for executing the auxiliary training task according to the original text sequence required for executing the speech translation training task may include:

performing text masking on a portion of sequence content in the original text sequence, so as to obtain the auxiliary text sequence having undergone text masking.

The text masking includes at least one of: deleting a portion of sequence content, or replacing a portion of sequence content.

Figure 4:
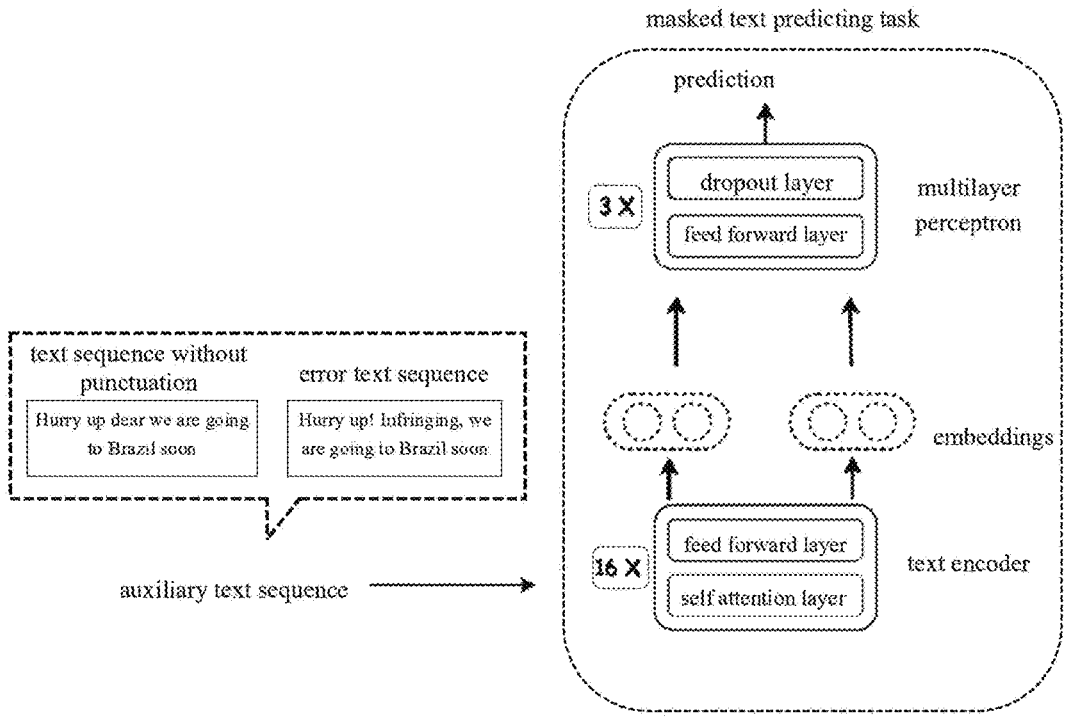
FIG. 4 is a schematic diagram of a principle applicable to implementing a masked text prediction task provided by an embodiment of the present disclosure.

Referring to in FIG. 4, corresponding to the auxiliary training task such as a masked text prediction task, a portion of sequence content in the original text sequence may be randomly masked, for example, a portion of sequence content is deleted and/or a portion of sequence content is replaced, to obtain a text sequence different from the original text sequence, and regard the same as a text sequence caused by an upstream speech recognition error of the speech translation model.

Optionally, performing text masking on the portion of sequence content in the original text sequence may include: selecting an original text sequence of a first proportion from at least two original text sequences acquired, and deleting any word in the original text sequence of the first proportion; selecting an original text sequence of a second proportion from at least two original text sequences acquired, and randomly selecting a word from the original text sequence of the second proportion to be replaced with any dictionary word; selecting an original text sequence of a third proportion from at least two original text sequences acquired, and randomly selecting a word from the original text sequence of the third proportion to be replaced with any other word in the same original text sequence. The sum of the first proportion, the second proportion, and the third proportion is 100%. For example, the first proportion, the second proportion, and the third proportion are respectively 50%, 25%, and 25%.

In another optional solution of this embodiment, determining the auxiliary text sequence required for executing the auxiliary training task according to the original text sequence required for executing the speech translation training task may include:

removing all punctuations from the original text sequence, so as to obtain an auxiliary text sequence having had text punctuations removed.

Figure 5:
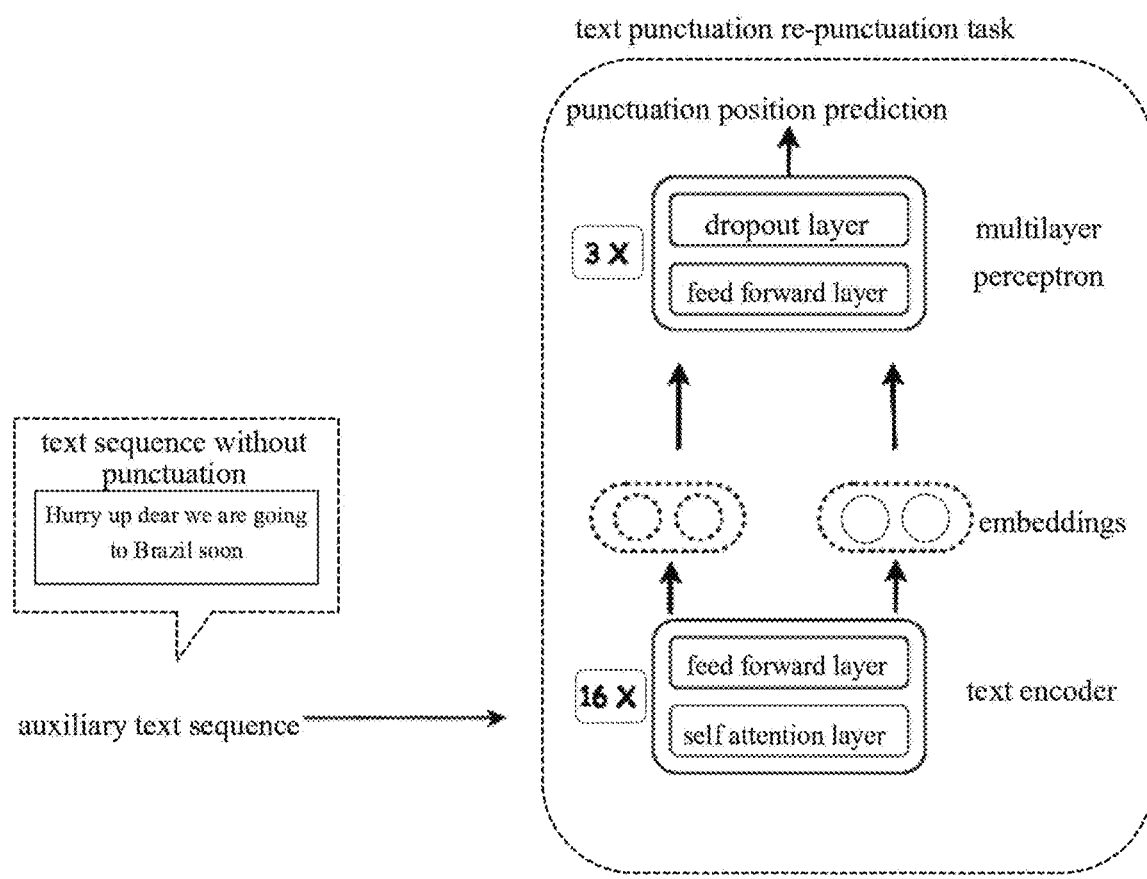
FIG. 5 is a schematic diagram of a principle applicable to implementing a text punctuation re-punctuation task provided by an embodiment of the present disclosure.

Referring to FIG. 5, corresponding to the auxiliary training task such as a text punctuation re-punctuation task, all special punctuations in the original text sequence may be removed, to obtain a non-punctuated text sequence different from the original text sequence. And the non-punctuated text sequence is taken as an auxiliary text sequence for executing the auxiliary training task of the speech translation training task in the speech translation model, so as to train the speech translation model through the auxiliary training task and explicitly integrate punctuation information of the original text sequence into the speech translation model.

In another optional solution of this embodiment, determining the auxiliary text sequence required for executing the auxiliary training task according to the original text sequence required for executing the speech translation training task may include:

performing text masking on a portion of sequence content in the original text sequence, constituting an auxiliary text sequence for text semantics contrastive learning by adopting the masked text and the randomly selected text.

The text masking includes at least one of: deleting a portion of sequence content, or replacing a portion of sequence content.

Figure 6:
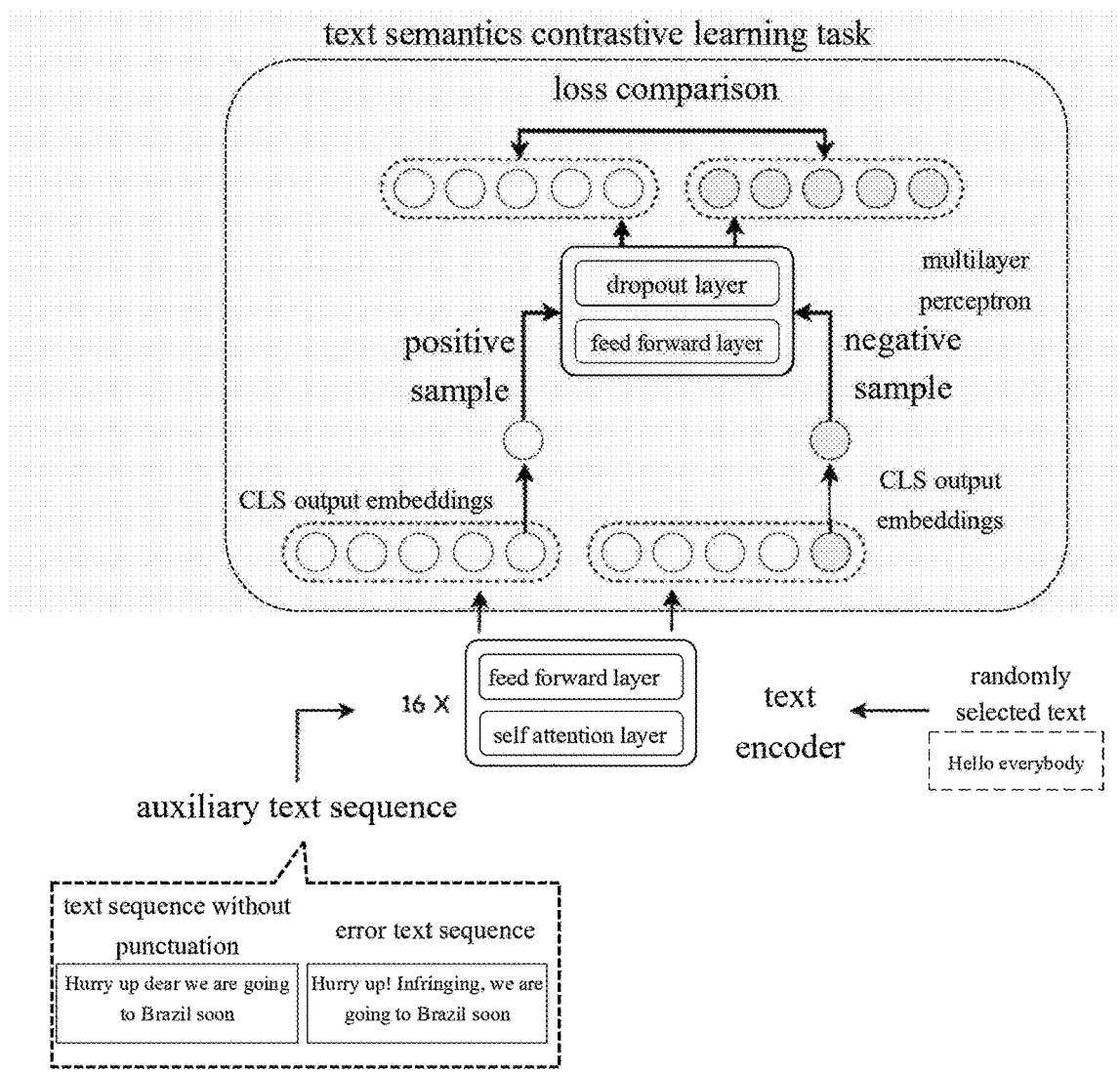
FIG. 6 is a schematic diagram of a principle applicable to implementing a text semantics contrastive learning task provided by an embodiment of the present disclosure.

Referring to FIG. 6, corresponding to the auxiliary training task such as a text semantics contrastive learning task, a text sequence after performing text masking on a portion of sequence content in the original text sequence and any text randomly selected from any dictionary may be acquired and constitute an auxiliary text sequence for text semantics contrastive learning. The process of text masking on the original text sequence will not be repeated here, for which the foregoing embodiments may be referred to.

S330: inputting the auxiliary text sequence into the speech translation model for executing the auxiliary training task of the speech translation training task, so as to obtain the loss function score of the auxiliary training task.

The auxiliary training task includes at least one of: predicting the masked text, re-punctuating the text having had punctuations removed, or text semantics contrastive learning.

Optionally, the speech translation training task in the speech translation model may adopt a cross entropy loss function, and the masked text prediction task in the auxiliary training task may also adopt a cross entropy loss function.

In an optional solution of this embodiment, when executing the masked text prediction task, inputting the auxiliary text sequence into the speech translation model for executing the auxiliary training task of the speech translation training task, so as to obtain the loss function score of the auxiliary training task, may include step A1 to step A3.

Step A1: inputting the auxiliary text sequence having undergone text masking into a text encoder of the speech translation model.

Step A2: feeding output of the text encoder into a multi-layer perceptron of the speech translation model for executing a text prediction task on the auxiliary text sequence having the masked text.

Step A3: determining a loss function score corresponding to the text prediction task in the auxiliary training task according to a text prediction result of the auxiliary text sequence having the masked text and an original text character in a position of text deletion or text replacement in the auxiliary text sequence having the masked text.

Referring to FIG. 4, an upstream task of the speech translation model is speech recognition, speech recognition inevitably leads to some recognition errors, and these recognition errors are particularly prominent in real scenarios. Thus, the present disclosure may introduce a masked text prediction task as an auxiliary training task, to constantly train and update the speech translation model by executing the masked text prediction task in the speech translation model, so as to improve recognition robustness of the speech translation model to automatic speech recognition (ASR).

Referring to FIG. 4, when performing text masking on a portion of sequence content in the original text sequence to obtain the auxiliary text sequence having undergone text masking, the original text having the deleted or replaced vocabulary given in a masked position may be taken as a training label at a same time. After feeding the output of the text encoder into the multilayer perceptron (MLP) of the speech translation model through embeddings, the multilayer perceptron will perform text prediction on the auxiliary text sequence having the masked text, to recover into the original text sequence. The text encoder in the diagram may include a self attention layer and a feed forward layer.

Referring to FIG. 4, the text prediction result of the auxiliary text sequence having the masked text is contrasted with the original text character in the position of text deletion or text replacement in the auxiliary text sequence having the masked text, and a loss function corresponding to the masked text prediction task is adopted for calculation to obtain the loss function score. The masked text prediction task in the auxiliary training task may also adopt a cross entropy loss function.

In the above-described mode, the masked text prediction task is introduced into the speech translation training process, which may effectively improve diversity of domain data, avoid as much as possible the problem of speech translation model generalization reduction caused by weak diversity of domain data, reduce sensitivity of the speech translation model to the output text, and improve robustness of the speech translation model to ASR recognition errors.

In another optional solution of this embodiment, when executing the text punctuation re-punctuation task, inputting the auxiliary text sequence into the speech translation model for executing the auxiliary training task of the speech translation training task to obtain the loss function score of the auxiliary training task may include step B1 to step B3.

Step B1: inputting the auxiliary text sequence having had text punctuations removed into the text encoder of the speech translation model.

Step B2: feeding a hidden layer vector representation corresponding to the text character output by the text encoder into the multilayer perceptron of the speech translation model, and executing the punctuation re-punctuation task on the auxiliary text sequence having had punctuations removed.

Step B3: determining a loss function score corresponding to the punctuation re-punctuation task in the auxiliary training task according to the punctuation character position predicted by the punctuation re-punctuation task and the punctuation character position of the original text sequence.

Relevant punctuation models are mostly generated by combining the language model with a human voice detecting module of speech recognition. However, in practical application scenarios, human pauses or noises will usually greatly reduce accuracy of punctuation generation. Punctuation accuracy improvement to a certain extent cannot directly improve quality of the translation. Referring to FIG. 5, the present disclosure introduces a punctuation re-punctuation task as an auxiliary training task, and punctuation information is explicitly integrated into the speech translation model through the text punctuation re-punctuation task, so as to reduce sensitivity of the speech translation model to text punctuation.

Referring to FIG. 5, in the process of executing the punctuation re-punctuation task, after the auxiliary text sequence having had the text punctuations removed passes through the text encoder, a hidden layer vector representation corresponding to a text character in each position may be output. After feeding the output of the text encoder into the multilayer perceptron (MLP) of the speech translation model though the embeddings, the multilayer perceptron will predict whether there is a punctuation character in a position corresponding to each text character according to the hidden layer vector representation corresponding to the text character in each position, so as to predict and recover the position for punctuation in the auxiliary text sequence.

Referring to FIG. 5, the punctuation character position predicted by the punctuation re-punctuation task is contrasted with an actual punctuation character position in the original text sequence, and a loss function corresponding to the punctuation re-punctuation task is adopted for calculation to obtain a corresponding loss function score, so as to facilitate subsequent model parameter update based on the loss function score. The punctuation re-punctuation task in the auxiliary training task may also adopt a cross entropy loss function.

In the above-described mode, the text punctuation re-punctuation task is introduced into the speech translation training process, so that punctuation information can be explicitly integrated into the speech translation model, which may reduce sensitivity of the speech translation model to punctuation during the translation process, reduce overfitting of special symbols such as punctuations in the translation model, reduce dependence of the translation model on punctuations, alleviate the problem of redundant translations caused by punctuation errors during the speech translation process, and improve robustness of the speech translation model to punctuation errors during the translation process.

In another optional solution of this embodiment, when executing the text semantics contrastive learning task, inputting the auxiliary text sequence into the speech translation model for executing the auxiliary training task of the speech translation training task, so as to obtain the loss function score of the auxiliary training task, may include step C1 to step C3.

Step C1: inputting the auxiliary text sequence into the text encoder of the speech translation model.

Step C2: feeding a hidden layer state corresponding to a terminator extracted by the text encoder into the multilayer perceptron of the speech translation model, and outputting a text semantics representation of the auxiliary text sequence through dropout layer of the multilayer perceptron.

Step C3: determining the loss function score corresponding to the text semantics contrastive learning task in the auxiliary training task, through semantic similarities of a text semantics representation of the original text sequence respectively to a text semantics representation of the masked text in the auxiliary text sequence and a text semantics representation of the randomly selected text.

Relevant robust machine translation solutions all ignore information in the text semantics level. Referring to FIG. 6, the present disclosure introduces a text semantics contrastive learning task as the auxiliary training task, to constantly train the speech translation model through the text semantics contrastive learning task, so that information in the text semantics level can be integrated into the speech translation model corresponding to the robust machine translation.

Introduction of the text semantics contrastive learning task into the speech translation training task needs to meet configurations below: a text similarity and a similarity between true semantics of texts are linearly correlated; and a text similarity between a randomly masked text and the original text is greater than a text similarity between the randomly selected text and the original text. Based on the above-described configuration requirements, the text semantics contrastive learning task may be used for integrating the information in the text semantics level into the speech translation model.

Referring to FIG. 6, the auxiliary text sequence required for executing the text semantics contrastive learning task includes a masked text obtained by performing text masking on a portion of sequence content in the original text sequence and a randomly selected text. The text encoder extracts a hidden layer state corresponding to a terminator from the masked text, a corresponding text semantics representation obtained through the dropout layer of the multilayer perceptron (MLP) is taken as a positive sample, the text encoder extracts a hidden layer state corresponding to a terminator from the randomly selected text, and a corresponding text semantics representation obtained through the dropout layer of the multilayer perceptron is taken as a negative sample.

Referring to FIG. 6, the text semantics representation of the masked text in the auxiliary text sequence is taken as a positive sample, the text semantics representation of the original text sequence is taken as an original sample, the positive sample and the original sample constitute a first sample pair, and a semantic similarity between the positive sample and the original sample in the first sample pair is calculated, so as to determine a first loss function score corresponding to the text semantics contrastive learning task in the auxiliary training task executed according to the first sample pair.

Referring to FIG. 6, the text semantics representation of the randomly selected text in the auxiliary text sequence is taken as the negative sample, the text semantics representation of the original text sequence is taken as the original sample, the negative sample and the original sample constitute a second sample pair, and a semantic similarity between the negative sample and the original sample in the second sample pair is calculated, so as to determine a second loss function score corresponding to the text semantics contrastive learning task in the auxiliary training task executed according to the second sample pair.

Referring to FIG. 6, a loss function score corresponding to the text semantics contrastive learning task in the auxiliary training task is determined by contrasting the first loss function score with the second loss function score. The vector representation between semantically similar texts is shortened, and vice versa. For example, a first loss function calculation formula corresponding to the positive sample is as follows:

$$\ell_i = -\log \frac{e^{sim(h_i, h_i^+)/\tau}}{\sum_{j=1}^{N} e^{sim(h_i, h_j^+)/\tau}}$$

$$sim(h_1, h_2) = \frac{h_1^T h_2}{\|h_1\| \|h_2\|}$$

Where, $(h_i, h_i^+)$ represents the first sample pair constituted by the original sample and the positive sample, T is a temperature coefficient parameter, N represents the number of samples, sim represents the similarity between the original sample and the positive sample. Similarly, a same loss function may be obtained from the negative sample, and no details will be repeated here.

In the above-described mode, the text semantics contrastive learning task is introduced into the speech translation training process, so that information in the text semantics level can be fully considered. The information in the text semantics level is integrated into the speech translation model, a semantic similarity between the masked text and the non-masked text can be narrowed by calculating the contrastive loss function between the positive and negative samples and the original sample, which takes full consideration of the problem of translation coherence, improves coherence of the translation context in the speech translation model, and enhances robustness of the speech translation model to text semantics bias during the translation process.

S340: adjusting the network parameters of the speech translation model according to the speech translation training task and the auxiliary training task, so as to obtain the updated speech translation model after training.

In an optional solution of this embodiment, adjusting the network parameters of the speech translation model according to the speech translation training task and the auxiliary training task may include step D1 to step D3.

Step D1: determining a loss function weight corresponding to the speech translation training task and loss function weights respectively corresponding to a plurality of auxiliary training tasks.

Step D2: performing loss fusion on the loss function score of the speech translation training task and the loss function scores of the plurality of auxiliary training tasks according to the loss function weight corresponding to the speech translation training task and the loss function weights respectively corresponding to the plurality of auxiliary training tasks, so as to obtain a total loss function score of the speech translation model.

Step D3: adjusting the network parameters of the speech translation model according to the total loss function score of the speech translation model.

For loss function fusion on the speech translation training task and the plurality of auxiliary training tasks, a formula below is adopted:

$$\ell_{all} = [\alpha_1, \alpha_2, \alpha_3, \alpha_4] \cdot [\ell_1, \ell_2, \ell_3, \ell_4]^T$$

Where, $1_{all}$ represents the total loss function score of the speech translation training task and the plurality of auxiliary training tasks having undergone loss fusion; the alpha ($\alpha$) vectors represent the loss function weight corresponding to the speech translation training task and the loss function weights respectively corresponding to the plurality of auxiliary training tasks, and $l_i$ represents a loss function score of a corresponding task.

In the above-described mode, the loss function score of the speech translation training task and the loss function scores of the plurality of auxiliary training tasks can be fused at the very beginning, and the total loss function score after fusion is used for overall training of the speech translation model. Since the fusion is performed at the very beginning, the speech translation bias caused by the bias between the text obtained with speech recognition bias and text semantics can undergo deep consideration in a fused manner, and thus the problem of lower generalization of the model due to weak diversity of domain data can be alleviated as much as possible.

In another optional solution of this embodiment, adjusting the network parameters of the speech translation model according to the speech translation training task and the auxiliary training task may include step E1 to step E2.

Step E1: separately adjusting network parameters of a speech translation portion in the speech translation model according to the loss function score obtained by executing the speech translation training task.

Step E2: separately adjusting network parameters of an auxiliary training portion of the speech translation portion in the speech translation model according to the loss function score of the auxiliary training task.

In the above-described mode, parameter optimization may be performed on respective network portions by using the loss function score of the speech translation training task and the loss function scores of the plurality of auxiliary training tasks, respectively, which may provide basis for performing subsequent weighted fusion on the loss function scores of the plurality of tasks.

In an optional solution of this embodiment, adjusting the network parameters of the speech translation model according to the speech translation training task and the auxiliary training task may further include step F1 to step F3.

Step F1: determining the loss function weight corresponding to the speech translation training task and the loss function weights respectively corresponding to the plurality of auxiliary training tasks, after separately adjusting the network parameters of the speech translation portion and the network parameters of the auxiliary training portion of the speech translation portion in the speech translation model respectively.

Step F2: performing loss fusion on the loss function score of the speech translation training task and the loss function scores of the plurality of auxiliary training tasks according to the loss function weight corresponding to the speech translation training task and the loss function weights respectively corresponding to the plurality of auxiliary training tasks, so as to obtain the total loss function score of the speech translation model.

Step F3: adjusting the network parameters of the speech translation model according to the total loss function score of the speech translation model.

In the above-described mode, parameter optimization is performed on respective network portions by using the loss function score of the speech translation training task and the loss function scores of the plurality of auxiliary training tasks, respectively; after the model networks corresponding to the plurality of tasks are trained to a certain extent, the loss function score of the speech translation training task and the loss function scores of the plurality of auxiliary training tasks are fused; the total loss function score after fusion is used for overall training of the speech translation model; and since respective networks are almost trained at the very beginning, the subsequent overall fusion training process can be accelerated.

In the method provided by the embodiments of the present disclosure, when training the speech translation model, the plurality of auxiliary training tasks are introduced for performing auxiliary training on the speech translation task, thereby weakening the translation bias caused by the bias between the text obtained with a speech recognition bias and text semantics, and optimizing robustness and generalization of speech translation in the simultaneous translation scenario, which can effectively improve diversity of domain data, improve translation quality in the simultaneous translation scenario, reduce dependence of the translation model on punctuations, and improve coherence of the translation context. In addition, the speech translation based on robust machine translation in the solutions of the present disclosure can effectively reduce sensitivity of the translation model to the output text, and reduce occurrence such as omissions, mistranslations, and over-translations to the original text due to disturbance of errors.

Figure 7:
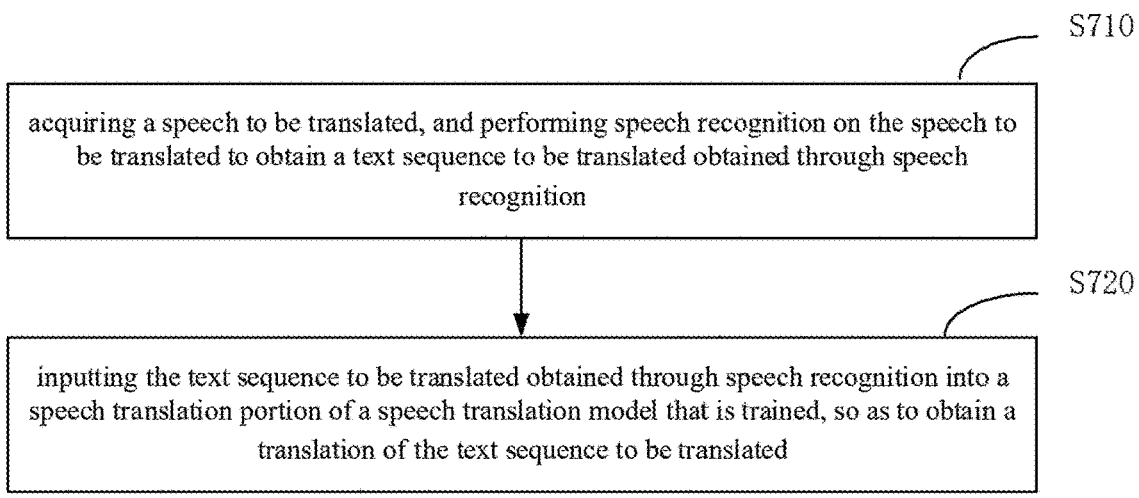
FIG. 7 is a structural block diagram of a training apparatus for a speech translation model provided by an embodiment of the present disclosure.

FIG. 7 is a flow chart of a speech translation method provided by an embodiment of the present application. This embodiment is applicable to the case of using a speech translation model. This method may be executed by a speech translation apparatus. The apparatus may be implemented in software and/or hardware and integrated on any electronic device having a network communication function. As illustrated in FIG. 7, the speech translation method of this embodiment may include step S710 to step S720 below.

S710: acquiring a speech to be translated and performing speech recognition on the speech to be translated to obtain a text sequence to be translated obtained through speech recognition.

The speech translation model is obtained by using the training method of the speech translation model provided by the above-described embodiments.

S720: inputting the text sequence to be translated obtained through speech recognition into the speech translation portion of the speech translation model having been trained, so as to obtain a translation of the text sequence to be translated.

Figure 8:
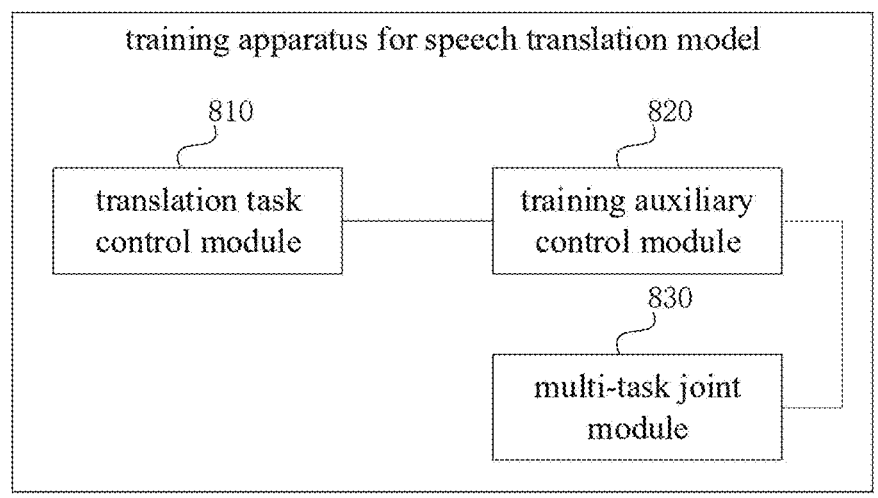
FIG. 8 is a flow chart of a speech translation method provided by an embodiment of the present disclosure.

FIG. 8 is a structural block diagram of a training apparatus of a speech translation model provided by an embodiment of the present disclosure. The apparatus of this embodiment is applicable to the case of training a speech translation model to improve robustness of speech translation. The apparatus may be implemented by software and/or hardware and is usually integrated on any electronic device having a network communication function. The electronic device includes: a device such as a computer, a personal digital assistant, etc. As illustrated in FIG. 8, the training method of the speech translation model of this embodiment may include: a translation task control module 810, a training auxiliary control module 820, and a multi-task joint module 830.

The translation task control module 810 is configured to control the speech translation model to execute a speech translation training task after entering a model training phase.

The training auxiliary control module 820 is configured to control the speech translation model to simultaneously execute an auxiliary training task of the speech translation training task.

The multi-task joint module 830 is configured to adjust network parameters of the speech translation model according to the speech translation training task and the auxiliary training task, so as to obtain an updated speech translation model after training.

The speech translation training task is used for translating an original text participating in speech recognition; and the auxiliary training task is used for weakening a translation bias generated on the speech translation model caused by a bias between a text obtained with a speech recognition bias and text semantics.

On the basis of the above-described embodiments, optionally, the training auxiliary control module 820 includes following units.

An auxiliary text determining unit is configured to determine an auxiliary text sequence required for executing the auxiliary training task according to the original text sequence required for executing the speech translation training task. The original text sequence includes the original text participating in speech recognition.

A training auxiliary control unit is configured to input the auxiliary text sequence into the speech translation model for executing the auxiliary training task of the speech translation training task, so as to obtain a loss function score of the auxiliary training task.

The auxiliary training task includes at least one of: predicting the masked text, re-punctuating the text having had punctuations removed, or text semantics contrastive learning.

On the basis of the above-described embodiments, optionally, the auxiliary text determining unit is configured to determine the auxiliary text sequence required for executing the auxiliary training task according to the original text sequence required for executing the speech translation training task in the mode below:

performing text masking on a portion of sequence content in the original text sequence, so as to obtain the auxiliary text sequence having undergone text masking.

The text masking includes at least one of: deleting a portion of sequence content or replacing a portion of sequence content.

On the basis of the above-described embodiments, optionally, the training auxiliary control unit is configured to input the auxiliary text sequence into the speech translation model for executing the auxiliary training task of the speech translation training task, so as to obtain a loss function score of the auxiliary training task, in the mode below:

inputting the auxiliary text sequence having undergone text masking into a text encoder of the speech translation model;

feeding output of the text encoder into a multilayer perceptron of the speech translation model for executing a text prediction task on the auxiliary text sequence having masked text; and determining a loss function score corresponding to the text prediction task in the auxiliary training task, according to a text prediction result of the auxiliary text sequence having the masked text and an original text character in a position of text deletion or text replacement in the auxiliary text sequence having the masked text.

On the basis of the above-described embodiments, optionally, the auxiliary text determining unit is configured to determine the auxiliary text sequence required for executing the auxiliary training task according to the original text sequence required for executing the speech translation training task in the mode below:

removing all punctuations from the original text sequence, so as to obtain an auxiliary text sequence having had text punctuations removed.

On the basis of the above-described embodiments, optionally, the training auxiliary control unit is configured to input the auxiliary text sequence into the speech translation model for executing the auxiliary training task of the speech translation training task, so as to obtain a loss function score of the auxiliary training task, in the mode below:

inputting the auxiliary text sequence having had text punctuations removed into the text encoder of the speech translation model;

feeding a hidden layer vector representation corresponding to the text character output by the text encoder into the multilayer perceptron of the speech translation model, and executing the text punctuation re-punctuation task on the auxiliary text sequence having had punctuations removed; and determining a loss function score corresponding to the punctuation re-punctuation task in the auxiliary training task, according to the punctuation character position predicted by the punctuation re-punctuation task and the punctuation character position of the original text sequence.

On the basis of the above-described embodiments, optionally, the auxiliary text determining unit is configured to determine the auxiliary text sequence required for executing the auxiliary training task according to the original text sequence required for executing the speech translation training task in the mode below:

performing text masking on a portion of sequence content in the original text sequence, constituting an auxiliary text sequence for text semantics contrastive learning by using the masked text and the randomly selected text.

On the basis of the above-described embodiments, optionally, the training auxiliary control unit is configured to input the auxiliary text sequence into the speech translation model for executing the auxiliary training task of the speech translation training task, so as to obtain a loss function score of the auxiliary training task, in the mode below:

inputting the auxiliary text sequence into the text encoder of the speech translation model;

feeding a hidden layer state corresponding to a terminator extracted by the text encoder into the multilayer perceptron of the speech translation model, and outputting a text semantics representation of the auxiliary text sequence through dropout of the multilayer perceptron; and determining the loss function score corresponding to the text semantics contrastive learning task in the auxiliary training task, through semantic similarities of a text semantics representation of the original text sequence relative to a text semantics representation of the masked text in the auxiliary text sequence and a text semantics representation of the randomly selected text, respectively.

On the basis of the above-described embodiments, optionally, the training auxiliary control unit is configured to determine the loss function score corresponding to the text semantics contrastive learning task in the auxiliary training task, through semantic similarities of a text semantics representation of the original text sequence relative to a text semantics representation of the masked text in the auxiliary text sequence and a text semantics representation of the randomly selected text, in the mode below:

taking the text semantics representation of the masked text in the auxiliary text sequence as a positive sample, taking the text semantics representation of the original text sequence as an original sample, constituting a first sample pair by using the positive sample and the original sample, and determining a first loss function score corresponding to the text semantics contrastive learning task in the auxiliary training task executed according to the first sample pair by calculating a semantic similarity between the positive sample and the original sample in the first sample pair;

taking the text semantics representation of the randomly selected text in the auxiliary text sequence as a negative sample, taking the text semantics representation of the original text sequence as an original sample, constituting a second sample pair by using the negative sample and the original sample, and determining a second loss function score corresponding to the text semantics contrastive learning task in the auxiliary training task executed according to the second sample pair by calculating a semantic similarity between the negative sample and the original sample in the second sample pair; and determining the loss function score corresponding to the text semantics contrastive learning task in the auxiliary training task by contrasting the first loss function score with the second loss function score.

On the basis of the above-described embodiments, optionally, the multi-task joint module 830 is configured to adjust network parameters of the speech translation model according to the speech translation training task and the auxiliary training task in the mode below:

determining a loss function weight corresponding to the speech translation training task and loss function weights respectively corresponding to a plurality of auxiliary training tasks;

performing loss fusion on the loss function score of the speech translation training task and the loss function scores of the plurality of auxiliary training tasks, according to the loss function weight corresponding to the speech translation training task and the loss function weights respectively corresponding to the plurality of auxiliary training tasks, so as to obtain a total loss function score of the speech translation model; and adjusting the network parameters of the speech translation model according to the total loss function score of the speech translation model.

On the basis of the above-described embodiments, optionally, the multi-task joint module 830 is configured to adjust network parameters of the speech translation model according to the speech translation training task and the auxiliary training task in the mode below:

separately adjusting network parameters of a speech translation portion in the speech translation model according to the loss function score obtained by executing the speech translation training task; and separately adjusting network parameters of an auxiliary training portion of the speech translation portion in the speech translation model according to the loss function score of the auxiliary training task.

On the basis of the above-described embodiments, optionally, the multi-task joint module 830 is configured to adjust network parameters of the speech translation model according to the speech translation training task and the auxiliary training task in the mode below:

determining the loss function weight corresponding to the speech translation training task and the loss function weights respectively corresponding to the plurality of auxiliary training tasks, after separately adjusting the network parameters of the speech translation portion and the network parameters of the auxiliary training portion of the speech translation portion in the speech translation model, respectively;

performing loss fusion on the loss function score of the speech translation training task and the loss function scores of the plurality of auxiliary training tasks, according to the loss function weight corresponding to the speech translation training task and the loss function weights respectively corresponding to the plurality of auxiliary training tasks, so as to obtain the total loss function score of the speech translation model; and adjusting the network parameters of the speech translation model according to the total loss function score of the speech translation model.

The training apparatus for the speech translation model provided by the embodiments of the present disclosure can execute the training method for the speech translation model provided by any of the above-described embodiments of the present disclosure, and has the corresponding functions and advantageous effects for executing the training method for the speech translation model. The relevant operations of the training method for the speech translation model of the foregoing embodiments may be referred to for a detailed process.

Figure 9:
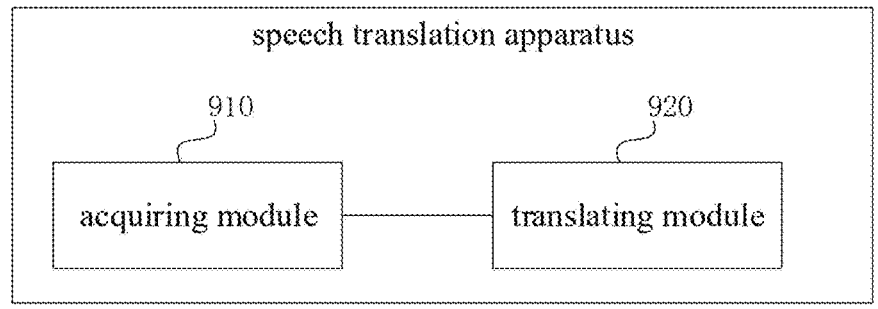
FIG. 9 is a structural block diagram of a speech translation apparatus provided by an embodiment of the present disclosure.

FIG. 9 is a structural block diagram of a speech translation apparatus provided by an embodiment of the present disclosure. This embodiment is applicable to the case of using a speech translation model. The apparatus may be implemented in software and/or hardware, and integrated on any electronic device having a network communication function. As illustrated in FIG. 9, the speech translation apparatus of this embodiment may include: an acquiring module 910 and a translating module 920.

The acquiring module 910 is configured to acquire a speech to be translated and perform speech recognition on the speech to be translated to obtain a text sequence to be translated obtained through speech recognition.

The translating module 920 is configured to input the text sequence to be translated obtained through speech recognition into the speech translation portion of the speech translation model having been trained, so as to obtain a translation of the text sequence to be translated.

The speech translation model is obtained by using the training method for the speech translation model of the above-described embodiments.

Hereinafter, referring to FIG. 10, it illustrates a schematic structural diagram of an electronic device 1000 suitable for implementing the embodiments of the present disclosure. The terminal device in the embodiments of the present disclosure may include a mobile terminal such as a mobile phone, a laptop, a digital broadcast receiver, a personal digital assistant (PDA), a portable android device (PAD), a portable multimedia player (PMP), a vehicle-mounted terminal (e.g., a vehicle-mounted navigation terminal), etc., and a stationary terminal such as a digital television (TV), a desktop computer, etc. The electronic device 1000 illustrated in FIG. 10 is only an example.

Figure 10:
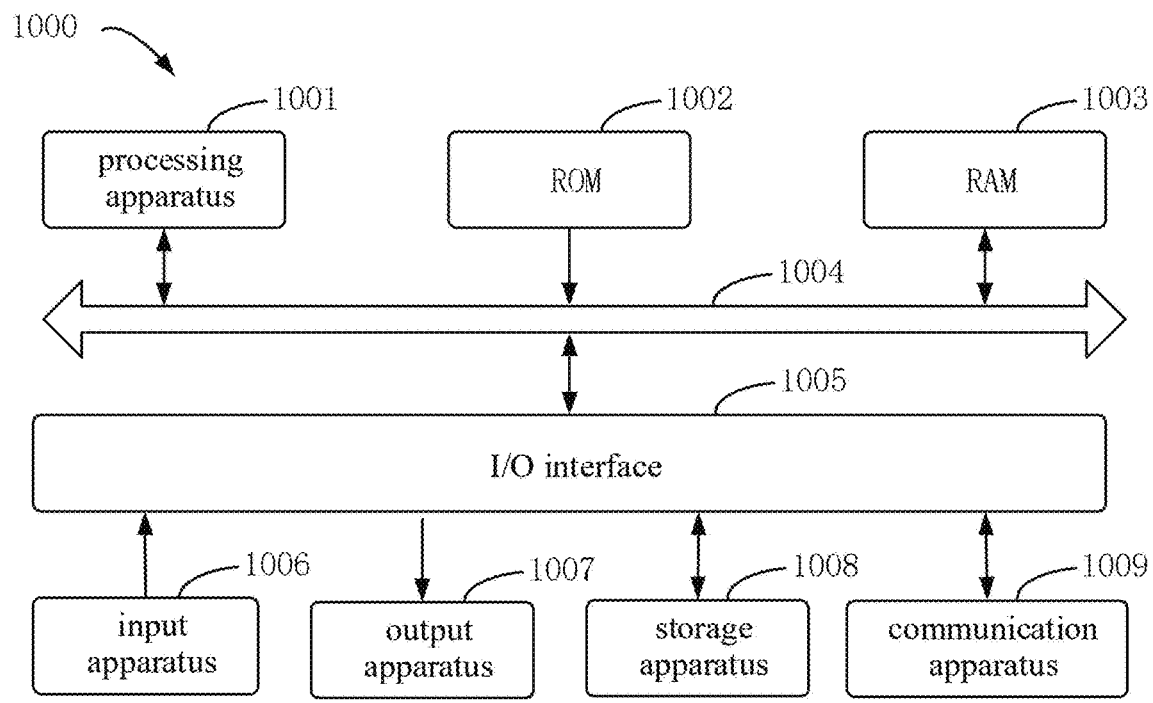
FIG. 10 is a structural block diagram of an electronic device that implements the training method for the speech translation model according to the embodiment of the present disclosure.

As illustrated in FIG. 10, the electronic device 1000 may include a processing apparatus (e.g., a central processing unit, a graphics processing unit, etc.) 1001, which may execute various appropriate actions and processing according to a program stored in a read-only memory (ROM) 1002 or a program loaded from a storage apparatus 1008 into a random access memory (RAM) 1003. The RAM 1003 further stores various programs and data required for operation of the electronic device 1000. The processing apparatus 1001, the ROM 1002, and the RAM 1003 are connected with each other through a bus 1004. An input/output (I/O) interface 1005 is also coupled to the bus 1004.

Usually, apparatuses below may be coupled to the I/O interface 1005: input apparatuses 1006 including, for example, a touch screen, a touch pad, a keyboard, a mouse, a camera, a microphone, an accelerometer, a gyroscope, etc.; output apparatuses 1007 including, for example, a liquid crystal display (LCD), a speaker, a vibrator, etc.; storage apparatuses 1008 including, for example, a magnetic tape, a hard disk, etc.; and a communication apparatus 1009. The communication apparatus 1009 may allow the electronic device 1000 to perform wireless or wired communication with other device to exchange data. Although FIG. 10 illustrates the electronic device 1000 including various apparatuses, it should be understood that it is not required to implement or have all the apparatuses illustrated, and the electronic device 1000 may alternatively implement or have more or fewer apparatuses.

According to the embodiments of the present disclosure, the process described above with reference to the flow chart may be implemented as computer software programs. For example, the embodiments of the present disclosure provide a computer program product, which includes a computer program carried on a non-transitory computer readable medium, and the computer program includes program codes for executing the training method for the speech translation model or the speech translation method illustrated in the flow charts. In such embodiments, the computer program may be downloaded and installed from the network via the communication apparatus 1009, or installed from the storage apparatus 1008, or installed from the ROM 1002. When executed by the processing apparatus 1001, the computer program may execute the above-described functions defined in the training method for the speech translation model or the speech translation method provided by the embodiments of the present disclosure.

The above-mentioned computer-readable medium in the present disclosure may be a computer-readable signal medium or a computer-readable storage medium or any combination thereof. For example, the computer-readable storage medium may be an electric, magnetic, optical, electromagnetic, infrared, or semiconductor system, apparatus or device, or any combination thereof. Examples of the computer-readable storage medium may include: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to:

after entering a model training phase, control the speech translation model to execute a speech translation training task;

control the speech translation model to simultaneously execute an auxiliary training task of the speech translation training task; and adjust network parameters of the speech translation model according to the speech translation training task and the auxiliary training task, so as to obtain an updated speech translation model after training.

The speech translation training task is used for translating an original text participating in speech recognition, and the auxiliary training task is used for weakening a translation bias generated on the speech translation model caused by a bias between a text obtained with a speech recognition bias and text semantics. The computer program codes for performing the operations of the present disclosure may be written in one or more programming languages or a combination thereof. The above-mentioned programming languages include object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances. For example, the first acquiring unit can also be described as "a unit that obtains at least two Internet protocol addresses".

The functions described herein above may be performed, at least partially, by one or more hardware logic components. For example, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes an electrical, magnetic, optical, electromagnetic, infrared, or semi-conductive system, apparatus or device, or any suitable combination of the foregoing. Examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, example 1 provides a training method for a speech translation model, and the training method comprises:

after entering a model training phase, controlling the speech translation model to execute a speech translation training task;

controlling the speech translation model to simultaneously execute an auxiliary training task of the speech translation training task; and adjusting network parameters of the speech translation model according to the speech translation training task and the auxiliary training task, so as to obtain an updated speech translation model after training, wherein the speech translation training task is used for translating an original text participating in speech recognition, and the auxiliary training task is used for weakening a translation bias generated on the speech translation model caused by a bias between a text obtained with a speech recognition bias and text semantics.

According to one or more embodiments of the present disclosure, in the method of example 2 according to example 1, controlling the speech translation model to simultaneously execute the auxiliary training task of the speech translation training task comprises:

determining an auxiliary text sequence required for executing the auxiliary training task according to an original text sequence required for executing the speech translation training task, wherein the original text sequence comprises the original text participating in speech recognition; and inputting the auxiliary text sequence into the speech translation model for executing the auxiliary training task of the speech translation training task, so as to obtain a loss function score of the auxiliary training task, wherein the auxiliary training task comprises at least one of: predicting a masked text, re-punctuating a text with punctuations removed, or text semantics contrastive learning.

According to one or more embodiments of the present disclosure, in the method of example 3 according to example 2, determining the auxiliary text sequence required for executing the auxiliary training task according to the original text sequence required for executing the speech translation training task comprises:

performing text masking on a portion of sequence content in the original text sequence, to obtain the auxiliary text sequence with text masking performed, wherein the text masking comprises at least one of: deleting the portion of sequence content, or replacing the portion of sequence content.

According to one or more embodiments of the present disclosure, in the method of example 4 according to example 2 or example 3, inputting the auxiliary text sequence into the speech translation model for executing the auxiliary training task of the speech translation training task, so as to obtain the loss function score of the auxiliary training task, comprises:

inputting the auxiliary text sequence with text masking performed into a text encoder of the speech translation model;

feeding output of the text encoder into a multilayer perceptron of the speech translation model for executing a text prediction task on the auxiliary text sequence having masked text; and determining the loss function score corresponding to the text prediction task in the auxiliary training task, according to a text prediction result of the auxiliary text sequence having the masked text and an original text character in a position of deletion or replacement in the auxiliary text sequence having the masked text.

According to one or more embodiments of the present disclosure, in the method of example 5 according to example 2, determining the auxiliary text sequence required for executing the auxiliary training task according to the original text sequence required for executing the speech translation training task comprises:

removing all punctuations from the original text sequence, so as to obtain the auxiliary text sequence with text punctuations removed.

According to one or more embodiments of the present disclosure, in the method of example 6 according to example 2 or example 5, inputting the auxiliary text sequence into the speech translation model for executing the auxiliary training task of the speech translation training task, so as to obtain the loss function score of the auxiliary training task, comprises:

inputting the auxiliary text sequence with text punctuations removed into a text encoder of the speech translation model;

feeding a hidden layer vector representation corresponding to a text character output by the text encoder into a multilayer perceptron of the speech translation model, and executing punctuation re-punctuation task on the auxiliary text sequence with punctuations removed; and determining the loss function score corresponding to the punctuation re-punctuation task in the auxiliary training task, according to a punctuation character position predicted by the punctuation re-punctuation task and a punctuation character position of the original text sequence.

According to one or more embodiments of the present disclosure, in the method of example 7 according to example 2, determining the auxiliary text sequence required for executing the auxiliary training task according to the original text sequence required for executing the speech translation training task comprises:

performing text masking on a portion of sequence content in the original text sequence, forming the auxiliary text sequence for text semantics contrastive learning from a masked text and a randomly selected text.

According to one or more embodiments of the present disclosure, in the method of example 8 according to example 2 or example 7, inputting the auxiliary text sequence into the speech translation model for executing the auxiliary training task of the speech translation training task, so as to obtain the loss function score of the auxiliary training task, comprises:

inputting the auxiliary text sequence into a text encoder of the speech translation model;

feeding a hidden layer state corresponding to a terminator extracted by the text encoder into a multilayer perceptron of the speech translation model, and outputting a text semantics representation of the auxiliary text sequence through a dropout layer of the multilayer perceptron; and determining the loss function score corresponding to a text semantics contrastive learning task in the auxiliary training task, through semantic similarities of a text semantics representation of the original text sequence relative to a text semantics representation of a masked text in the auxiliary text sequence and a text semantics representation of a randomly selected text, respectively.

According to one or more embodiments of the present disclosure, in the method of example 9 according to example 8, determining the loss function score corresponding to the text semantics contrastive learning task in the auxiliary training task, through the semantic similarities of the text semantics representation of the original text sequence relative to the text semantics representation of the masked text in the auxiliary text sequence and the text semantics representation of the randomly selected text, respectively, comprises:

taking the text semantics representation of the masked text in the auxiliary text sequence as a positive sample, taking the text semantics representation of the original text sequence as an original sample, forming a first sample pair from the positive sample and the original sample, and determining a first loss function score corresponding to the text semantics contrastive learning task in the auxiliary training task executed according to the first sample pair by calculating a semantic similarity between the positive sample and the original sample in the first sample pair;

taking the text semantics representation of the randomly selected text in the auxiliary text sequence as a negative sample, taking the text semantics representation of the original text sequence as an original sample, forming a second sample pair from the negative sample and the original sample, and determining a second loss function score corresponding to the text semantics contrastive learning task in the auxiliary training task executed according to the second sample pair by calculating a semantic similarity between the negative sample and the original sample in the second sample pair; and determining the loss function score corresponding to the text semantics contrastive learning task in the auxiliary training task by contrasting the first loss function score with the second loss function score.

According to one or more embodiments of the present disclosure, in the method of example 10 according to example 2, adjusting the network parameters of the speech translation model according to the speech translation training task and the auxiliary training task comprises:

determining a loss function weight corresponding to the speech translation training task and loss function weights respectively corresponding to a plurality of auxiliary training tasks;

performing loss fusion on a loss function score of the speech translation training task and loss function scores of the plurality of auxiliary training tasks according to the loss function weight corresponding to the speech translation training task and the loss function weights respectively corresponding to the plurality of auxiliary training tasks, so as to obtain a total loss function score of the speech translation model; and adjusting the network parameters of the speech translation model according to the total loss function score of the speech translation model.

According to one or more embodiments of the present disclosure, in the method of example 11 according to example 2, adjusting the network parameters of the speech translation model according to the speech translation training task and the auxiliary training task comprises:

separately adjusting network parameters of a speech translation portion in the speech translation model according to a loss function score obtained by executing the speech translation training task; and separately adjusting network parameters of an auxiliary training portion of the speech translation portion in the speech translation model according to the loss function score of the auxiliary training task.

According to one or more embodiments of the present disclosure, in the method of example 12 according to example 11, adjusting the network parameters of the speech translation model according to the speech translation training task and the auxiliary training task comprises:

determining a loss function weight corresponding to the speech translation training task and loss function weights respectively corresponding to the plurality of auxiliary training tasks, after separately adjusting the network parameters of the speech translation portion and the network parameters of the auxiliary training portion of the speech translation portion in the speech translation model;

performing loss fusion on the loss function score of the speech translation training task and the loss function scores of the plurality of auxiliary training tasks according to the loss function weight corresponding to the speech translation training task and the loss function weights respectively corresponding to the plurality of auxiliary training tasks, so as to obtain a total loss function score of the speech translation model; and adjusting the network parameters of the speech translation model according to the total loss function score of the speech translation model.

According to one or more embodiments of the present disclosure, example 13 provides a speech translation method, and the speech translation method comprises:

acquiring a speech to be translated, and performing speech recognition on the speech to be translated to obtain a text sequence to be translated obtained through speech recognition; and inputting the text sequence to be translated obtained through speech recognition into a speech translation portion of a speech translation model that is trained, so as to obtain a translation of the text sequence to be translated, wherein the speech translation model is obtained by using the training method for the speech translation model according to any one of examples 1 to 12.

According to one or more embodiments of the present disclosure, example 14 provides a training apparatus for a speech translation model, and the training apparatus comprises:

a translation task control module, configured to, after entering a model training phase, control the speech translation model to execute a speech translation training task;

a training auxiliary control module, configured to control the speech translation model to simultaneously execute an auxiliary training task of the speech translation training task; and a multi-task joint module, configured to adjust network parameters of the speech translation model according to the speech translation training task and the auxiliary training task, so as to obtain an updated speech translation model after training, wherein the speech translation training task is used for translating an original text participating in speech recognition, and the auxiliary training task is used for weakening a translation bias generated on the speech translation model caused by a bias between a text obtained with a speech recognition bias and text semantics.

According to one or more embodiments of the present disclosure, example 15 provides a speech translation apparatus, and the speech translation apparatus comprises:

an acquiring module, configured to acquire a speech to be translated and perform speech recognition on the speech to be translated to obtain a text sequence to be translated obtained through speech recognition; and a translating module, configured to input the text sequence to be translated obtained through speech recognition into a speech translation portion of a speech translation model that is trained, so as to obtain a translation of the text sequence to be translated, wherein the speech translation model is obtained by using the training method for the speech translation model according to any one of examples 1 to 12.

According to one or more embodiments of the present disclosure, example 16 provides an electronic device, and the electronic device comprises:

at least one processor; and a memory in communicative connection with the at least one processor, wherein the memory stores a computer program executable by the at least one processor, and the computer program is executed by the at least one processor to cause the at least one processor to be capable of executing the training method for the speech translation model according to any one of examples 1 to 12 or the speech translation method according to example 13.

According to one or more embodiments of the present disclosure, example 17 provides a computer readable medium, wherein the computer readable medium stores computer instructions, and the computer instructions, when executed by a processor, are configured to implement the training method for the speech translation model according to any one of examples 1 to 12 or the speech translation method according to example 13.

In addition, although multiple operations are described in a specific order, this should not be understood as requiring them to be executed in the illustrated specific order or in sequential order. In certain environments, multitasking and parallel processing may be advantageous. Some features described in the context of individual embodiment can also be combined to be implemented in a single embodiment. On the contrary, multiple features described in the context of a single embodiment can also be implemented separately or in any suitable sub-combination in multiple embodiments.

The invention claimed is:

1. A training method for a speech translation model, comprising:

after entering a model training phase, controlling the speech translation model to execute a speech translation training task;

controlling the speech translation model to simultaneously execute an auxiliary training task of the speech translation training task; and adjusting network parameters of the speech translation model according to the speech translation training task and the auxiliary training task, so as to obtain an updated speech translation model after training, so that a translation that is generated by the updated speech translation model and displayed to a user is real-time consistent with a speech to be translated, wherein the speech translation training task is used for translating an original text participating in speech recognition, and the auxiliary training task is used for weakening a translation bias generated on the speech translation model caused by a bias between a text obtained with a speech recognition bias and text semantics.

2. The method according to claim 1, wherein controlling the speech translation model to simultaneously execute the auxiliary training task of the speech translation training task comprises:

determining an auxiliary text sequence required for executing the auxiliary training task according to an original text sequence required for executing the speech translation training task, wherein the original text sequence comprises the original text participating in speech recognition; and inputting the auxiliary text sequence into the speech translation model for executing the auxiliary training task of the speech translation training task, so as to obtain a loss function score of the auxiliary training task, wherein the auxiliary training task comprises at least one of: predicting a masked text, re-punctuating a text with punctuations removed, or text semantics contrastive learning.

3. The method according to claim 2, wherein determining the auxiliary text sequence required for executing the auxiliary training task according to the original text sequence required for executing the speech translation training task comprises:

performing text masking on a portion of sequence content in the original text sequence, to obtain the auxiliary text sequence with text masking performed, wherein the text masking comprises at least one of: deleting the portion of sequence content, or replacing the portion of sequence content.

4. The method according to claim 2, wherein inputting the auxiliary text sequence into the speech translation model for executing the auxiliary training task of the speech translation training task, so as to obtain the loss function score of the auxiliary training task, comprises:

inputting the auxiliary text sequence with text masking performed into a text encoder of the speech translation model;

feeding output of the text encoder into a multilayer perceptron of the speech translation model for executing a text prediction task on the auxiliary text sequence having masked text; and determining the loss function score corresponding to the text prediction task in the auxiliary training task, according to a text prediction result of the auxiliary text sequence having the masked text and an original text character in a position of deletion or replacement in the auxiliary text sequence having the masked text.

5. The method according to claim 2, wherein determining the auxiliary text sequence required for executing the auxiliary training task according to the original text sequence required for executing the speech translation training task comprises:
  removing all punctuations from the original text sequence, so as to obtain the auxiliary text sequence with text punctuations removed.

6. The method according to claim 2, wherein inputting the auxiliary text sequence into the speech translation model for executing the auxiliary training task of the speech translation training task, so as to obtain the loss function score of the auxiliary training task, comprises:
  inputting the auxiliary text sequence with text punctuations removed into a text encoder of the speech translation model;
  feeding a hidden layer vector representation corresponding to a text character output by the text encoder into a multilayer perceptron of the speech translation model, and executing punctuation re-punctuation task on the auxiliary text sequence with punctuations removed; and
  determining the loss function score corresponding to the punctuation re-punctuation task in the auxiliary training task, according to a punctuation character position predicted by the punctuation re-punctuation task and a punctuation character position of the original text sequence.

7. The method according to claim 2, wherein determining the auxiliary text sequence required for executing the auxiliary training task according to the original text sequence required for executing the speech translation training task comprises:
  performing text masking on a portion of sequence content in the original text sequence, forming the auxiliary text sequence for text semantics contrastive learning from a masked text and a randomly selected text.

8. The method according to claim 2, wherein inputting the auxiliary text sequence into the speech translation model for executing the auxiliary training task of the speech translation training task, so as to obtain the loss function score of the auxiliary training task, comprises:
  inputting the auxiliary text sequence into a text encoder of the speech translation model;
  feeding a hidden layer state corresponding to a terminator extracted by the text encoder into a multilayer perceptron of the speech translation model, and outputting a text semantics representation of the auxiliary text sequence through a dropout layer of the multilayer perceptron; and
  determining the loss function score corresponding to a text semantics contrastive learning task in the auxiliary training task, through semantic similarities of a text semantics representation of the original text sequence relative to a text semantics representation of a masked text in the auxiliary text sequence and a text semantics representation of a randomly selected text, respectively.

9. The method according to claim 8, wherein determining the loss function score corresponding to the text semantics contrastive learning task in the auxiliary training task, through the semantic similarities of the text semantics representation of the original text sequence relative to the text semantics representation of the masked text in the auxiliary text sequence and the text semantics representation of the randomly selected text, respectively, comprises:
  taking the text semantics representation of the masked text in the auxiliary text sequence as a positive sample, taking the text semantics representation of the original text sequence as an original sample, forming a first sample pair from the positive sample and the original sample, and determining a first loss function score corresponding to the text semantics contrastive learning task in the auxiliary training task executed according to the first sample pair by calculating a semantic similarity between the positive sample and the original sample in the first sample pair;
  taking the text semantics representation of the randomly selected text in the auxiliary text sequence as a negative sample, taking the text semantics representation of the original text sequence as an original sample, forming a second sample pair from the negative sample and the original sample, and determining a second loss function score corresponding to the text semantics contrastive learning task in the auxiliary training task executed according to the second sample pair by calculating a semantic similarity between the negative sample and the original sample in the second sample pair; and
  determining the loss function score corresponding to the text semantics contrastive learning task in the auxiliary training task by contrasting the first loss function score with the second loss function score.

10. The method according to claim 2, wherein adjusting the network parameters of the speech translation model according to the speech translation training task and the auxiliary training task comprises:
  determining a loss function weight corresponding to the speech translation training task and loss function weights respectively corresponding to a plurality of auxiliary training tasks;
  performing loss fusion on a loss function score of the speech translation training task and loss function scores of the plurality of auxiliary training tasks according to the loss function weight corresponding to the speech translation training task and the loss function weights respectively corresponding to the plurality of auxiliary training tasks, so as to obtain a total loss function score of the speech translation model; and
  adjusting the network parameters of the speech translation model according to the total loss function score of the speech translation model.

11. The method according to claim 2, wherein adjusting the network parameters of the speech translation model according to the speech translation training task and the auxiliary training task comprises:
  separately adjusting network parameters of a speech translation portion in the speech translation model according to a loss function score obtained by executing the speech translation training task; and
  separately adjusting network parameters of an auxiliary training portion of the speech translation portion in the speech translation model according to the loss function score of the auxiliary training task.

12. The method according to claim 11, wherein adjusting the network parameters of the speech translation model according to the speech translation training task and the auxiliary training task comprises:
  determining a loss function weight corresponding to the speech translation training task and loss function weights respectively corresponding to a plurality of auxiliary training tasks, after separately adjusting the network parameters of the speech translation portion and the network parameters of the auxiliary training portion of the speech translation portion in the speech translation model;
  performing loss fusion on the loss function score of the speech translation training task and the loss function scores of the plurality of auxiliary training tasks according to the loss function weight corresponding to the speech translation training task and the loss function weights respectively corresponding to the plurality of auxiliary training tasks, so as to obtain a total loss function score of the speech translation model; and adjusting the network parameters of the speech translation model according to the total loss function score of the speech translation model.

13. A speech translation method, comprising:

acquiring a speech to be translated, and performing speech recognition on the speech to be translated to obtain a text sequence to be translated obtained through speech recognition; and inputting the text sequence to be translated obtained through speech recognition into a speech translation portion of a speech translation model that is trained, so as to obtain a translation of the text sequence to be translated, wherein the speech translation model is obtained by using the training method for the speech translation model according to claim 1.

14. A speech translation apparatus, comprising at least one hardware processor, wherein the at least one hardware processor is configured to:

acquire a speech to be translated and perform speech recognition on the speech to be translated to obtain a text sequence to be translated obtained through speech recognition; and input the text sequence to be translated obtained through speech recognition into a speech translation portion of a speech translation model that is trained, so as to obtain a translation of the text sequence to be translated, wherein the speech translation model is obtained by using the training method for the speech translation model according to claim 1.

15. An electronic device, comprising:

at least one processor; and a memory in communicative connection with the at least one processor, wherein the memory stores a computer program executable by the at least one processor, and the computer program is executed by the at least one processor to cause the at least one processor to be capable of executing the training method for the speech translation model according to claim 1.

16. A non-transitory computer readable medium, wherein the computer readable medium stores computer instructions, and the computer instructions, when executed by a processor, are configured to implement the training method for the speech translation model according to claim 1.

17. The electronic device according to claim 15, wherein controlling the speech translation model to simultaneously execute the auxiliary training task of the speech translation training task comprises:

determining an auxiliary text sequence required for executing the auxiliary training task according to an original text sequence required for executing the speech translation training task, wherein the original text sequence comprises the original text participating in speech recognition; and inputting the auxiliary text sequence into the speech translation model for executing the auxiliary training task of the speech translation training task, so as to obtain a loss function score of the auxiliary training task, wherein the auxiliary training task comprises at least one of: predicting a masked text, re-punctuating a text with punctuations removed, or text semantics contrastive learning.

18. A training apparatus for a speech translation model, comprising at least one hardware processor, wherein the at least one hardware processor is configured to: after entering a model training phase, control the speech translation model to execute a speech translation training task;

control the speech translation model to simultaneously execute an auxiliary training task of the speech translation training task; and adjust network parameters of the speech translation model according to the speech translation training task and the auxiliary training task, so as to obtain an updated speech translation model after training, so that a translation that is generated by the updated speech translation model and displayed to a user is real-time consistent with a speech to be translated, and wherein the speech translation training task is used for translating an original text participating in speech recognition, and the auxiliary training task is used for weakening a translation bias generated on the speech translation model caused by a bias between a text obtained with a speech recognition bias and text semantics.

19. An electronic device, comprising:

at least one processor; and a memory in communicative connection with the at least one processor, wherein the memory stores a computer program executable by the at least one processor, and the computer program is executed by the at least one processor to cause the at least one processor to be capable of executing the speech translation method according to claim 13.

20. A non-transitory computer readable medium, wherein the computer readable medium stores computer instructions, and the computer instructions, when executed by a processor, are configured to implement the speech translation method according to claim 13.

\* \* \* \* \*